(12) United States Patent
Zhang et al.

(10) Patent No.: US 10,997,025 B2
(45) Date of Patent: May 4, 2021

(54) RAID-BASED GLOBALLY RESOURCE-SHARED DATA STORAGE SYSTEM

(71) Applicant: Tsinghua University, Beijing (CN)

(72) Inventors: Guangyan Zhang, Beijing (CN); Weimin Zheng, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 16/856,133

(22) Filed: Apr. 23, 2020

(65) Prior Publication Data
US 2020/0250036 A1    Aug. 6, 2020

Related U.S. Application Data

(63) Continuation of application No. PCT/CN2017/110662, filed on Nov. 13, 2017.

(51) Int. Cl.
*G06F 11/10* (2006.01)
*G06F 11/20* (2006.01)

(52) U.S. Cl.
CPC ...... *G06F 11/1092* (2013.01); *G06F 11/1096* (2013.01); *G06F 11/2089* (2013.01); *G06F 2211/104* (2013.01)

(58) Field of Classification Search
CPC ............ G06F 11/1092; G06F 11/1084; G06F 11/1096; G06F 11/2089; G06F 2211/104
See application file for complete search history.

(56) References Cited

U.S. PATENT DOCUMENTS

| | | | |
|---|---|---|---|
| 5,488,701 A | 1/1996 | Brady et al. | |
| 8,453,036 B1* | 5/2013 | Goel | G06F 11/1096 714/763 |
| 2016/0062835 A1* | 3/2016 | Kozawa | G06F 11/1088 714/764 |

FOREIGN PATENT DOCUMENTS

| | | |
|---|---|---|
| CN | 101482802 A | 7/2009 |
| CN | 104765660 A | 7/2015 |
| CN | 104965768 A | 10/2015 |

* cited by examiner

*Primary Examiner* — Joseph R Kudirka
(74) *Attorney, Agent, or Firm* — IPro, PLLC

(57) ABSTRACT

The data storage system is a RAID-based data storage system in which resources are globally shared. This storage system includes the first number of disks, and the RAID mechanism is used to store data on each disk. The blocks on different disks form stripes, and at least one of the blocks on the stripe stores the parity information, wherein the width of the stripe is less than the first number. The data layout of the data storage system satisfies the following characteristics: any two physical blocks in the stripe are distributed on different disks; the data blocks distributed on each disk are the same, and the distributed parity blocks are also the same; other data in the stripe associated with any piece of disk data is evenly distributed across all the remaining disks. Normal data layout and degraded data layout can be implemented by orthogonal Latin squares. This system can remove the limitation that the number of disks in the normal data storage system is equal to the stripe width, and break the resource isolation between the disk groups. And in the event of a disk failure, this invention can achieve a complete equalization of the reconstructed read load.

11 Claims, 3 Drawing Sheets

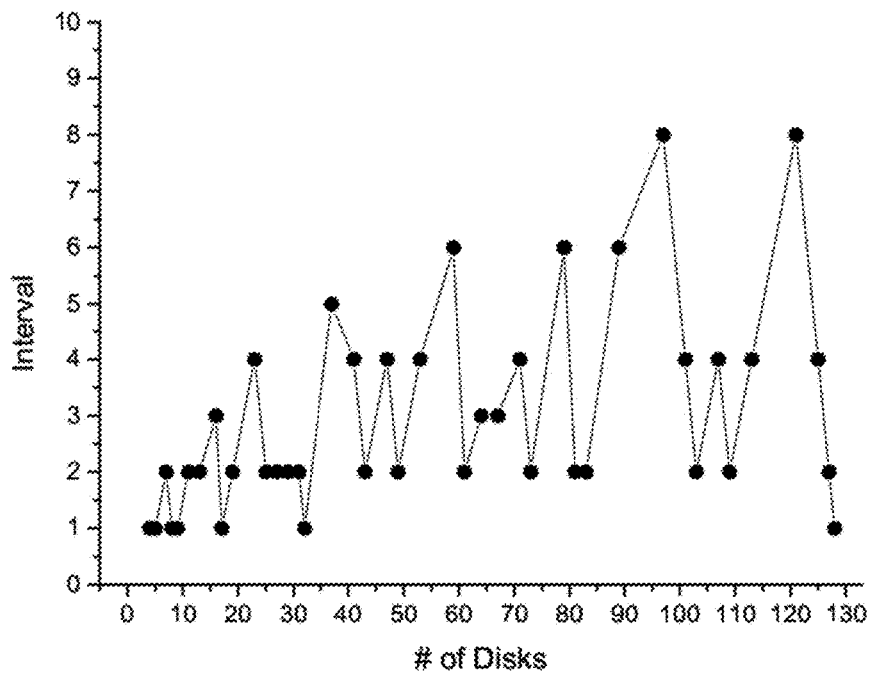

Fig.4A  Fig.4B  Fig.4C

RAID-BASED GLOBALLY RESOURCE-SHARED DATA STORAGE SYSTEM

FIELD OF THE INVENTION

This invention involves storage array technology, particularly a fast recovery storage array data organization.

BACKGROUND OF THE INVENTION

For the past 30 years of development, Redundant Array of Independent Disks (abbr. RAID) has been developed into today's mainstream high-reliability and high-availability persistent storage technologies, and has been widely used in enterprise servers, modern data centers, cloud platforms, and supercomputers.

Storage arrays use striping technology to organize multiple disks together to provide greater storage capacity and processing power. Currently, most organizations use parity-based RAID levels (RAID5 and RAID6) to provide fault-tolerant protection of data with redundant data inside the stripe.

In the traditional storage array data organization mode, disks are divided into disk groups with different RAID levels and different disk numbers, and disk groups form isolated storage islands with each other. When a disk fails, all surviving disks in the failed disk group participate in data reconstruction. It is necessary to read the entire disk data and write the reconstructed data to a single hot spare disk. This isolated mode makes it difficult for the remaining free disk groups to share the load of data reconstruction. As disk capacities have grown continuously in recent years, the rebuilding time of large-capacity disk arrays have been tens of hours or even days. During the long repair process, the upper-layer business faces a high risk of data loss and a long-term decline in I/O performance. It can be seen that the slow reconstruction of data organization in current storage array is a problem.

SUMMARY OF THE INVENTION

With regard to the aforementioned situation, this invention is proposed.

According to one aspect of this invention, a RAID-based data storage system in which resources are globally shared (Sometimes referred to as RAID+ in the following parts), is presented. The storage system includes a first number of disks, and the RAID mechanism is used to store data on each disk. Blocks on different disks form stripes, and at least one of the blocks on a stripe stores the parity information, wherein the width of the stripe is less than the first number. The data layout of the data storage system satisfies the following characteristics: any two physical blocks in the stripe are distributed on different disks; both the data blocks and the parity blocks distributed on each disk are the same; other data in the stripe associated with any piece of disk data is evenly distributed across all the remaining disks.

In an embodiment of the invention, the aforementioned first number in the data storage system is a power of a prime number, represented by the number n, and n is greater than or equal to 4. The width of the stripe is indicated by the number k, and where for the number n, (n−1) orthogonal Latin squares can be obtained. The data layout of the data storage system is generated as follows: k mutual orthogonal Latin squares in (n−1) mutual orthogonal Latin squares are obtained with rows having same element values in the k mutual orthogonal Latin squares ignored, and then all remaining positions in the k mutual orthogonal Latin squares are traversed in a row-first order, combining element values in same row and column into a mapping group, and each mapping group corresponds to one stripe, and value of each element in the mapping group indicates ordinal number of a disk on which each block in a corresponding stripe is placed.

In an embodiment of the invention, wherein the k mutual orthogonal Latin squares are generated according to the following theorem: the first row of each Latin square is ignored, and the first mutual orthogonal Latin square is represented by $L_0$, assuming the element on the $i^{th}$ row and $j^{th}$ column of the $m^{th}$ orthogonal Latin square to be $L_{m-1}[ij]$, the mapping group $(L_0[ij], L_1[ij], \ldots L_{m-1}[ij], \ldots, L_{k-1}[ij])$ indicates ordinal numbers of disks on which respective blocks on the $((i-1)*n+j)^{th}$ stripe are placed, wherein the first block is placed on the $L_0[ij]^{th}$ disk, the $m^{th}$ block is placed on the $L_{m-1}[ij]^{th}$ disk, and the $k^{th}$ block is placed on the $L_{k-1}[ij]^{th}$ disk, wherein data for each of these disks are placed in blocks, theorem: for a complete set of mutually orthogonal Latin squares with its order being a power of a prime number, the $i^{th}$ Latin square $f_i(i\hat{1}[1, n-1])$ has the element value $fi[x, y]=i\cdot x+y$ in the $x^{th}$ row and $y^{th}$ column, here the operator "·" and '+' are the multiplication and addition in a finite field.

In an embodiment of the invention, wherein when one disk fails, for each failed stripe associated with the failed disk, data from other disks associated with the failed stripe for calculating reconstructed data are concurrently read, and the reconstructed data are stored in free space reserved on all other disks, an ordinal number of the disk on which the reconstructed data is written is determined as follows: selecting a Latin square from (n−1) mutual orthogonal Latin squares other than the k mutual orthogonal Latin squares, and referring it as the $(k+1)^{th}$ Latin square. For each failed stripe associated with the failed disk, identifying position on the Latin squares corresponding to the failed stripe, and obtaining element value at this position on the $(k+1)^{th}$ Latin square, this element value indicating the ordinal number of the disk on which the reconstructed data block is placed, storing the reconstructed data block in free space of the disk indicated by the number.

In an embodiment of the invention, wherein when there is another disk failure, a Latin square of (n−1) mutual orthogonal Latin squares other than aforementioned (k+1) Latin squares is selected and referred as the $(k+2)^{th}$ Latin square, for each failed stripe associated with the failed disk, position on the Latin squares corresponding to the failed stripe is identified, and element value at the position on the $(k+2)^{th}$ Latin square is obtained, the element value indicating the ordinal number of the disk on which the reconstructed data block is placed, the reconstructed data block is stored in free space of the disk indicated by the number.

In an embodiment of the invention, wherein when p disks fail simultaneously, a stripe associated with any one of the p disks is determined, for any of the stripes associated with any of the p failed disks, the number of data blocks in stripes that locate on those p failed disks; a higher recovery priority for a stripe having a larger number of data blocks located in the p failed disks is assigned; the stripe with higher priority is recovered with priority.

In an embodiment of the invention, the data storage system stores data with different storage templates, for first data to be stored in a first template manner, a first corresponding space in the first number of disks is allocated to the first data; for the first corresponding space in the first number of disk, mapping relationship between data stripes in the first template and the first corresponding space is established according to the Latin square based method mentioned before; for second data to be stored in a second template manner, a second corresponding space in the first number of disks is allocated to the second data; for the second corresponding space in the first number of disk, mapping relationship between the data stripes in the second template and the second corresponding space is established according to the Latin square based method mentioned before.

In an embodiment of the invention, wherein the different templates at least differ in one aspect of RAID levels, stripe width, physical block size, and inter-stripe addressing policy.

In an embodiment of the invention, the corresponding space is denoted as a logical volume, and each logical volume uses a same type of data template as granularity of storage space allocation, wherein indexing technique is used to track physical location of each data template in a logical volume, and metadata is maintained to realize map between user volumes and physical space, the metadata is cached in memory when the data storage system works.

In an embodiment of the invention, wherein when a user request arrives, a specific physical access location is located by querying index tables, locating data templates, locating stripes, locating internal block locations of stripes, and calculating global locations.

In an embodiment of the invention, wherein when data to store is desired to be stored in a read-friendly ordering, mapping relationship between stripes and disks is determined according to the Latin square based method mentioned before, wherein a parity block in one stripe is the last data block of the stripe, individual stripes are sorted so that the ordinal number of the disk on which the last block in a stripe is located is the ordinal number of the disk on which the first data block in the next stripe is located.

In an embodiment of the invention, wherein when data to store is desired to be stored in a write-friendly ordering, a parity block in one stripe is the last block of the stripe, individual stripes are sorted so that the ordinal number of the disk on which the last block in a stripe is located is a certain amount less than the ordinal number of the disk on which the first block in the next stripe is located, the certain amount is a row number of a position of a mapping group corresponding to the stripe in the Latin squares used.

The above embodiment of the invention provides a normal data layout, and the normal data layout is used to realize a balanced distribution of short data stripes in a larger disk pool.

The above embodiment of the invention designs a degraded data layout, using the degraded data layout to guide the redistribution of reconstructed data after a disk failure.

The above embodiment of the invention provides a method for sustained self-healing recovery. With this recovery method, the storage array implements self-healing recovery under a series of disk failures.

The above technical solution has one or more of the following advantages or benefits:

The normal data layout designed by the embodiment of the invention can remove the limitation that in normal data storage system, the number of disks must be equal to stripe width. It breaks the resource isolation between the disk groups, and achieves a complete balance of the reconstructed read load when a disk fails. The degraded data layout of the design can distribute the lost data evenly to all the remaining disks without manual replacement of the bad disk, achieving complete balance of the reconstructed write load. Under the guarantee of double balance for both read load and write load, the reconstruction speed of storage array is improved. And in a series of disk failures, the storage array achieves continuous self-healing without manual intervention.

BRIEF DESCRIPTION OF THE DRAWINGS

FIG. 1 shows an exemplary complete set of mutually orthogonal Latin squares diagram;

FIG. 2 shows 42 legal values that satisfy the prime power limit when the number of disks is between 4 and 128;

FIG. 4A, FIG. 4B and FIG. 4C are diagrams showing an exemplary configuration of a degraded data layout provided by the embodiment of the invention.

DETAILED DESCRIPTION

Figures 3A, 3B, 3C:
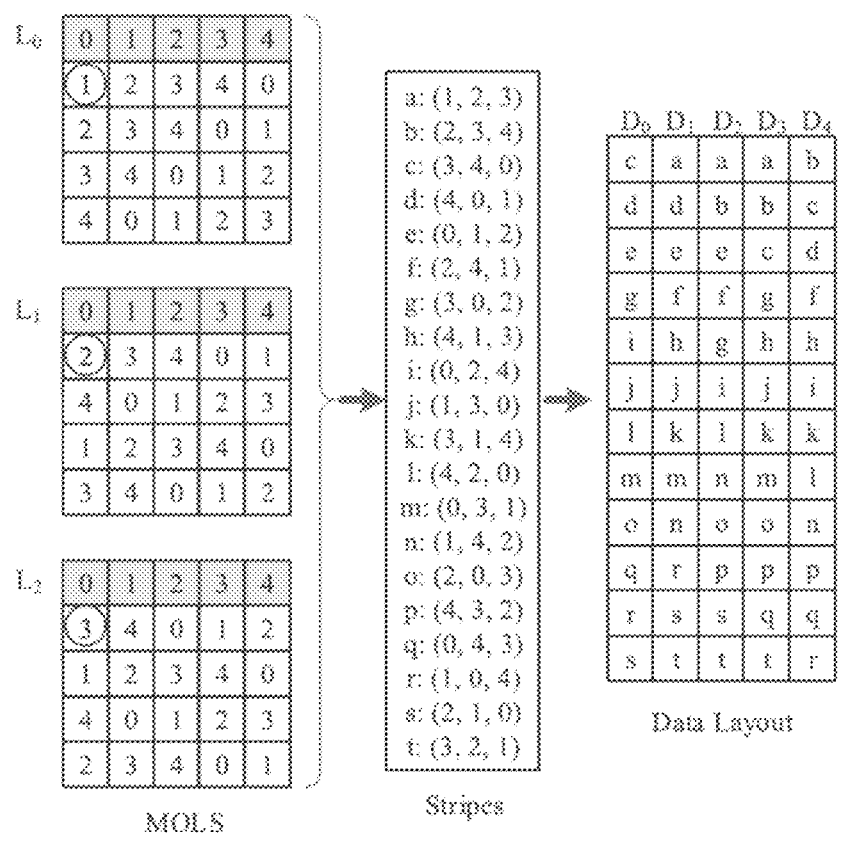
FIG. 3A, FIG. 3B and FIG. 3C illustrate a schematic diagram of an exemplary method of constructing a normal data layout of a data storage array based on orthogonal Latin squares in the embodiment of the invention.

To clearly display the technical problems, our technical solution and the advantages of our method, the following description will be combined with the attached drawings and practical embodiment.

The first thing to note is that the word "same" in the sentence "numbers of data blocks distributed on each disk are the same, and numbers of parity blocks distributed on each disk are also the same" should be comprehended as exactly or nearly exactly the same. That is to say, when the amount of data is large enough, this data distribution can be guaranteed by mutual orthogonal Latin squares in the invention. However, it is not excluded that the data blocks are basically but not exactly the same when the amount of data is relatively small in practical application. Similarly, "blocks sharing stripes with blocks on any given disk are distributed evenly among all the other disks" should also be applied to large data amount. Obviously, under some extreme circumstances, like the total amount of the stripes is only one or two, it is impossible to satisfy that the remaining data of the stripes that are associated to data on disk A uniformly distribute on disk B, disk C, disk D, etc.

The phrase Stripe Width or Stripe Size means the amount of disks that a stripe spans.

The embodiments of the invention utilize the mathematical features of orthogonal Latin squares in Combinatorial mathematics to construct a storage system (sometimes referred as RAID+ in the following parts). The perfect features of orthogonal Latin squares support the uniformly distributed data expected in the invention.

The definition and theorem of mutually orthogonal Latin square are briefly presented below. Detailed information can be found in related materials like reference [1]: Bose R C, Shrikhande S S. On the construction of sets of mutually orthogonal Latin squares and the falsity of a conjecture of euler. Transactions of the American Mathematical Society, 1960, 95(2):191-209.

Definition 1: A Latin square of order n is a n×n array filled with n different items, each occurring exactly once in each row and column.

Definition 2: Let L1 and L2 be two n-order Latin squares. L1 and L2 are mutually orthogonal if, when superimposed, each of the $n^2$ ordered pairs occur exactly once across the overlapping cells of the two squares.

Definition 3: Given a set of Latin squares, if all its member pairs are mutually orthogonal, we call it a set of mutually orthogonal Latin squares (MOLS).

Theorem 1: With any given order n, there can be at most (n−1) MOLS, with this upper bound achieved when n is a power of a prime number.

Theorem 2: For a complete set of MOLS with its order a power of a prime number, the $i^{th}$ Latin square $f_i(i \in [1, n-1])$ has the element value fi[x; y]=i·x+y in $x^{th}$ row and $y^{th}$ column. Detailed information is available in reference 1 mentioned above. Here the operator "·" and "+" are the multiplication and summation in finite field.

Theorem 3: If two Latin squares of order n are mutually orthogonal, for the n positions that any number $d(d \in [0; n-1])$ appears in one of the two Latin squares, numbers on corresponding positions in the other Latin square are exactly n different numbers.

As is mentioned above, based on the theory discovery, when the order of matrix is a power of a prime number, at most n−1 different mutually orthogonal Latin squares of this order can be constructed. For example, as shown in FIG. 1, there are 4 different mutually orthogonal Latin squares when the order is 5.

Based on the mathematical features of orthogonal Latin squares that this invention utilizes to implement the storage array technology, the normal data layouts generated satisfy three features: First, any two physical blocks in one stripe distribute on different disks, making the layout fault-tolerant. Second, the number of data blocks and parity blocks are identical in every disk, which makes the loads in all disks totally balanced. Third, the remaining parts of the data associated to any disk distribute equally among the remaining disks, to make the read load totally balanced when reconstructing data.

In an embodiment of the invention, wherein the first number is a power of a prime number, and the first number is represented by a number n, which is greater than or equal to 4, stripe width is indicated by a number k, and for the number n, (n−1) orthogonal Latin squares being capable of being obtained, data layout of the data storage system is generated as follows: k mutual orthogonal Latin squares in (n−1) mutual orthogonal Latin squares are obtained with rows having same element values in the k mutual orthogonal Latin squares ignored, and then all remaining positions in the k mutual orthogonal Latin squares are traversed in a row-first order, combining element values in same row and column into a mapping group, and each mapping group corresponds to one stripe, and value of each element in the mapping group indicates ordinal number of a disk on which each block in a corresponding stripe is placed.

What needs illustration is that although it sounds rigorous to restrict the disk number to be a prime number, a large quantity of numbers can be chosen in practical application, and the intervals of them are not very large, so most need of users can be satisfied. For instance, if the disk number is limited between 4 and 128, n has 42 legal options: 4, 5, 7, 8, 9, 11, 13, 16, 17, 19, 23, 25, 27, 29, 31, 32, 37, 41, 43, 47, 49, 53, 59, 61, 64, 67, 71, 73, 79, 81, 83, 89, 97, 101, 103, 107, 109, 113, 121, 125, 127 and 128. These legal numbers are displayed in FIG. 2 with y-axis stands for their intervals. It is clear that only 2 points have an interval of 8. Most intervals are scattered in [2, 4]. In other words, for a disk configuration of an illegal number, users only need to add or cut down a small number of disks to meet the need of RAID+. As the disk pool is supposed to consist of tens to hundreds of disks, there are a large number of legal number available.

Specifically, in an embodiment of the invention, wherein the k mutual orthogonal Latin squares are generated according to the aforementioned theorem 2: the first row of each Latin square is ignored, and the first mutual orthogonal Latin square is represented by $L_0$, assuming the element on the $i^{th}$ row and $j^{th}$ column of the $m^{th}$ orthogonal Latin square to be $L_{m-1}[ij]$, the mapping group ($L_0[ij]$, $L_{m-1}[ij]$, . . . , $L_{k-1}[ij]$) indicates ordinal numbers of disks on which respective blocks on the $((i-1)*n+j)^{th}$ stripe are placed, wherein the first block is placed on the $L_0[ij]^{th}$ disk, the $m^{th}$ block is placed on the $L_{m-1}[ij]^{th}$ disk, and the $k^{th}$ block is placed on the $L_{k-1}[ij]^{th}$ disk, wherein data for each of these disks are placed in blocks FIGS. 3A-3C illustrate a schematic diagram of an exemplary method of constructing a normal data layout of a data storage array based on mutual orthogonal Latin squares in the embodiment of the invention. To construct a data layout of n disks (which is 5 in FIGS. 3A-3C and k stripe width (which is 3 in FIGS. 3A-3C): k orthogonal Latin squares of order n are generated first. As shown in FIG. 3A, the identical first rows of the k squares are eliminated. Rows and columns are numbered from the matrixes without the first lines in the remaining part of this article, like the first row of matrix $L_0$ is {1, 2, 3, 4, 0}. Then the remaining parts of mutual orthogonal Latin squares are traversed in row-first order. Numbers on the same place (i.e. elements with the same row and column numbers) are combined to form the mapping groups in FIG. 3B. For instance, the mapping group of the stripe a is formed by the elements on the first row and first column among the three squares, that is a: (1, 2, 3). This is because $L_0$ is 1 in the first row and first column, $L_1$ is 2 in the first row and first column and $L_2$ is 3 in the first row and first column. The following mapping group of the second stripe b contains the elements on the first row and second column of the three squares, which is b: (2, 3, 4). By this rule, the mapping group of the $20^{th}$ stripe t (4*5=20, element numbers in a matrix with four rows and five columns) consists of elements in the fourth row and fifth columns, which is t (3, 2, 1).

In FIG. 3B, the numbers in stripe groups stands for the disks numbers of the disks on which the physical blocks are placed. For example, a: (1, 2, 3) denotes that the first physical stripe in FIG. 3B (number a) has three physical blocks, which are placed in disks of number 1, 2 and 3. b: (2, 3, 4) denotes that the second physical stripe (number b in FIG. 3B (number a) has three physical blocks, which are placed in disks 2, 3 and 4. That is in FIG. 3B the three physical blocks of the first physical stripe (number a) are placed in disks of number 2, 3 and 4, and so on with other physical stripes. The last mapping group t: (3, 2, 1) denotes that the $20^{th}$ physical stripe (number t) has three physical blocks, which are placed in disks of number 3, 2 and 1. Finally, the correct data layouts are obtained by placing the physical blocks into the associated disks according to the orders in stripes. As is shown in FIG. 3C, only fixed columns in mapping groups are needed to guide the partition of data blocks and parity blocks inside stripes.

According to the mathematical characteristics of orthogonal Latin square that this invention resorts to, the generated normal data layout satisfies three features: First, any two physical blocks in one stripe distribute on different disks, making the layout fault-tolerant. Second, the number of data blocks and parity blocks are identical in every disk, which makes the load in all disks totally balanced. Third, the remaining parts of the data associated to any disk distribute equally among the remaining disks, to make the read load totally balanced when reconstructing data.

The normal data layout of storage arrays according to the embodiments of the present invention is introduced above, and centralized hot standby disks are replaced by distributed free blocks. The following part describes the solution to disk failures in storage array based on the embodiment of this invention.

According to the embodiments of the present invention, when a disk fails in the storage array, data reconstructed will be uniformly written into the surviving disks.

In an embodiment of the invention, wherein when one disk fails, for each failed stripe associated with the failed disk, data from other disks associated with the failed stripe for calculating reconstructed data are concurrently read, and the reconstructed data are stored in free space reserved on all other disks, In specific, an ordinal number of the disk on which the reconstructed data is written can be determined as follows:

selecting a Latin square from (n−1) mutual orthogonal Latin squares other than the k mutual orthogonal Latin squares, and referring it as the $(k+1)^{th}$ Latin square, for each failed stripe associated with the failed disk, identifying position on the Latin squares corresponding to the failed stripe, and obtaining element value at this position on the $(k+1)^{th}$ Latin square, this element value indicating the ordinal number of the disk on which the reconstructed data block is placed, In this way, the reconstructed data block can be stored in free space of the disk indicated by the number.

In an embodiment of the invention, wherein when there is another disk failure, a Latin square of (n−1) mutual orthogonal Latin squares other than aforementioned (k+1) Latin squares is selected and referred as the $(k+2)^{th}$ Latin square, for each failed stripe associated with the failed disk, position on the Latin squares corresponding to the failed stripe is identified, and element value at the position on the $(k+2)^{th}$ Latin square is obtained, the element value indicating the ordinal number of the disk on which the reconstructed data block is placed, in this way the reconstructed data block can be stored in free space of the disk indicated by the number.

In another embodiment of the invention, wherein when p disks fail simultaneously, the following processes are performed: a stripe associated with any one of the p disks is determined, for any of the stripes associated with any of the p failed disks, the number of data blocks in stripe that locate on those p failed disks is determined; a higher recovery priority for a stripe having a larger number of data blocks located in the p failed disks is assigned; the stripe with higher priority is recovered with priority.

Then an example is used to illustrate how to construct degraded data layout when a disk fails.

The degraded data layout in the invention utilizes the reserved free space in every disk to store reconstructed data, and orthogonal Latin squares are used to reconstruct data distribution. When the order of matrix n is a power of a prime number, we can get n−1 different orthogonal Latin squares. The normal data layout utilizes k of them, with the remaining n−k−1 squares intact. When constructing degraded data distribution, an intact square is first selected from these n−k−1 squares, then the numbers in the same position of wrong stripes in this new square are the numbers of disks for the redistribution of loss data. Finally, data lost by wrong stripes will be reconstructed in the free areas of this disk.

Figures 4A, 4B, 4C:
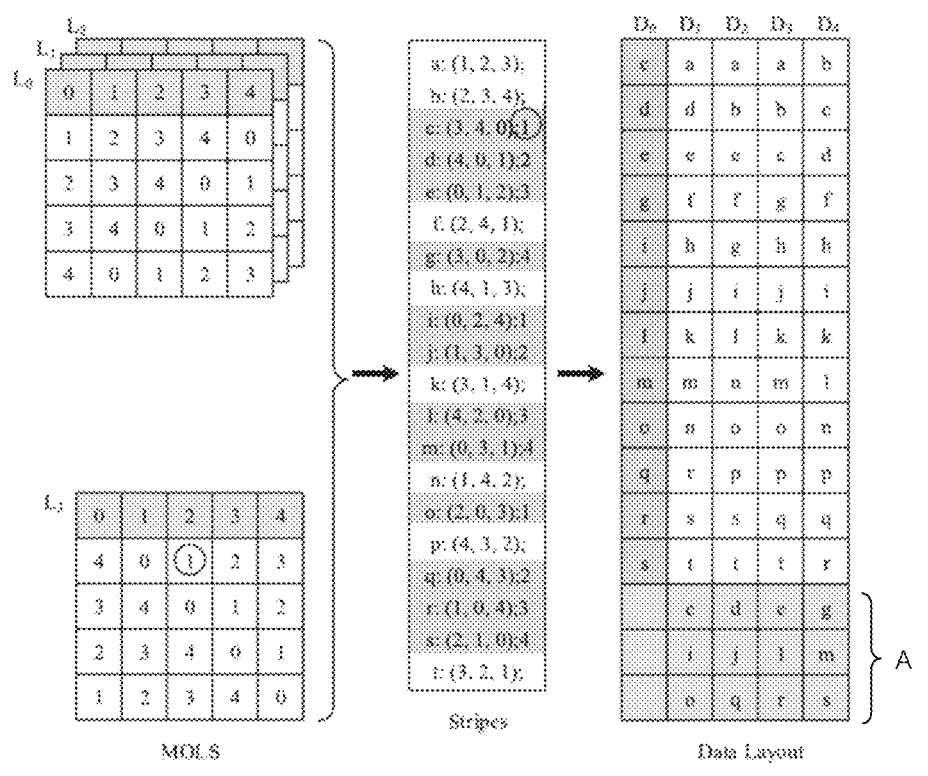

In the above introduction of data layout, the number of disks in the disk array in FIGS. 3A-3C is five, and the order of orthogonal Latin square is also five. The five-order mutual orthogonal Latin squares chosen are $L_0$, $L_1$, $L_2$. Taking this as an example again, FIGS. 4A-4C presents the operation procedure of constructing degraded data layout when a disk fails. During this process, the last orthogonal Latin square $L_3$ will be used.

Without loss of generality, we assume disk $D_0$ fails.

As shown in FIGS. 4A-4C, every disk has 12 physical blocks in a 5×12 normal data layout. Thus failure of $D_0$ will cause data loss in the 12 physical blocks. Right side of FIG. 4C clearly displays stripes distribution among the disks. The first physical block on disk $D_0$ belongs to stripe c, that is to say the set of redundant information (2 data blocks and a parity block) inside stripe c is no longer complete. Applying this reasoning from top to bottom, we can get the set of wrong stripes {c, d, e, s}. There are exactly 12 different stripes in this set because the normal data distribution guarantees that any two physical blocks in the same stripe will not be distributed to the same disk.

To recover these 12 wrong stripes, the data storage systems based on the invention not only need to know the physical location of the other intact data on these stripes, but also have to find new spaces on the disks to store the data reconstructed.

The middle column of FIG. 4B gives complete information of stripe mapping groups. The mapping group of stripe c is (3, 4, 0), which indicates that when stripe c losses parity block (the last number in the mapping group denotes the disk of parity block), the remaining two blocks are stored on disk $D_3$ and disk $D_4$ respectively. Similarly, the mapping group of stripe d is (4, 0, 1). When it losses a data block, the remaining data is distributed on disk $D_4$ and the parity block is distributed on disk $D_1$. Apart from original physical mapping, the mapping group (α, β, γ) of wrong stripes in the figure has new physical location θ behind it. θ is the new disk number that the lost physical blocks in the stripes remapping to. Take stripe c as an example again, the new disk number is 1, which means after reconstruction, the reconstructed data will be stored on disk $D_1$. Number 1 is not equal to any number in the original mapping relation (3, 4, 0). Therefore, stripes on the same physical blocks can continue distributing on different disks. Letter A with brace in FIG. 4C shows the newly added physical blocks on every disk. A 4×3 degraded data layout is exactly formed by 12 lost physical blocks.

FIG. 4A presents the method to generate a new disk number. A new orthogonal Latin square $L_3$ is introduced into the original k mutual orthogonal Latin squares. Assuming the position of the wrong stripe in the table is (x, y), then the number of $L_3$ in (x, y) is the remapping disk number. It is clear that the writing loads of data reconstruction are equally distributed among all surviving disks in a degraded data layout, and this layout is still fault-tolerant. Close counting of the reading loads on every disk shows that every surviving disk reads 6 physical blocks. That is to say, reading loads are balanced as well. After the reconstruction, the degraded data layout presents the following features: First, any two physical blocks in a wrong stripe are still located on different disks, thus the degraded data layout remains fault-tolerant. Second, the amount of newly added physical blocks among all disks are equal, which fulfills the full balance of writing loads in data reconstruction. As this balance is already realized in normal data layout, it allows all disks to read and write in a parallel way, which enhance the reconstructing speeds of the storage array.

If failures happen again after the reconstruction of a single disk, we only need to repeat the construction of degraded data layout with new orthogonal Latin squares to realize continuous quick recovery. Specifically, for the $t^{th}$ disk failure, an orthogonal Latin square should be picked from the n−k−t squares to guide the construction of degraded data layout, and we can get the degraded data layout of n−t disks. When disk failure occurs n−k−1 times, the number of disks available decrease to k+1. If another failure occurs in this time, the disk selection of reconstruction only has one choice as the stripe width k is equal to the disk number. Thus we can get the degraded data layout under k disks. In this process, as the degraded data maintains fault tolerance, the storage array can achieve continuous self-recovery without the need to manually replace the bad disks.

In an embodiment of the invention, the data storage system stores data with different storage templates, for first data to be stored in a first template manner, a first corresponding space in the first number of disks is allocated to the first data; for the first corresponding space in the first number of disk, mapping relationship between data stripes in the first template and the first corresponding space is established according to the Latin square based method mentioned before; for second data to be stored in a second template manner, a second corresponding space in the first number of disks is allocated to the second data; for the second corresponding space in the first number of disk, mapping relationship between the data stripes in the second template and the second corresponding space is established according to the Latin square based method mentioned before.

In an embodiment of the invention, wherein the different templates at least differ in one aspect of RAID levels, stripe width, physical block size, and inter-stripe addressing policy.

A main advantage of the data storage system RAID+ based on the invention is that it can provide multiple virtual RAID arrays (that is RAID volumes) in the same disk pool. Each user volume serves different users or loads. When there are multiple users, every user is allocated different logical volume. Every logical volume utilizes the same data template as granularity of space allocation.

Configuration of data templates are mutually independent among different logical volumes. The system administrator can allocate multiple volumes with different stripe width, size of physical blocks, the rank of RAID or the addressing strategy.

RAID+ can track the physical location of each data template in a logical volume through indexing techniques. As each data template is relatively large, containing n×(n−1)×k physical blocks, and the metadata just need to record the physical location of data templates without individually mapping every physical block inside the template, RAID+ can achieve mapping between user volumes and physical space with low metadata overheads. By caching metadata in memory, RAID+ can achieve fast query of the templates' physical location and reduce processing latency in address translation.

When a user request arrives, RAID+ follows the 5 steps below to locate specific physical access locations (Algorithm 1):

1. Locating data templates: Based on the logical location x the user requests, template number $\#_t$ and offset $\delta_t$ inside template can be calculated by combing x with the size of user data space it inside single data template.

2. Querying index tables: Based on the index table of user volume, a function is called to get the physical offset $off_t$ of template $\#_t$.

3. Locating stripes: With the offset $\delta_t$ inside template and the size of data space $l_s$ in stripes, we can get the stripe number $\#_s$ of the request inside the template and the offset $\delta_s$ inside the stripe. Then by querying the mapping between stripes and disks, we can get the set of disk numbers disks that the physical blocks of stripes $\#_s$ belong to.

4. Locating internal locations of stripes: Considering the offset $\delta_s$ inside stripes and the access order of logical blocks under stripes' internal layout, we can get id, the number of physical blocks visited inside the stripe, and off, the offset of logical blocks inside templates.

5. Calculating global locations: The number of disks to visit disk[id] can derived from physical block number id and the mapping relations between stripes and disk number set disks. Then global disk offset is equal to template offset $off_t$ and logical block offset off.

In an embodiment of the invention, for data storage system deployed by the features of the orthogonal Latin squares, for data to store, wherein when data to store is desired to be stored in a read-friendly ordering, mapping relationship between stripes and disks is determined according to the Latin square based method mentioned before, wherein a parity block in one stripe is the last data block of the stripe, individual stripes are sorted so that the ordinal number of the disk on which the last block in a stripe is located is the ordinal number of the disk on which the first data block in the next stripe is located.

In an embodiment of the invention, for data storage system deployed by the features of the orthogonal Latin squares, for data to store, wherein when data to store is desired to be stored in a write-friendly ordering, a parity block in one stripe is the last block of the stripe. Individual stripes are sorted so that the ordinal number of the disk on which the last block in a stripe is located is a certain amount less than the ordinal number of the disk on which the first block in the next stripe is located, the certain amount is a row number of a position of a mapping group corresponding to the stripe in the Latin squares used.

Various embodiments of the invention have been described above. The above description is exemplary, not exhaustive, and the present invention is not limited to the disclosed embodiments. Without deviating from the scope and spirit of the illustrated embodiments, many modifications and changes are obvious to the normal technician in this technical field. Therefore, the scope of protection of the invention shall be subject to the scope of protection claimed.

The invention claimed is:

1. A Redundant Array of Independent Disks (RAID)-based data storage system in which resources are globally shared, including a first number of disks, wherein a RAID mechanism is used to store data on each disk, blocks on different disks form stripes, and at least one of the blocks in a stripe stores parity information, wherein a width of a stripe is less than the first number, and a data layout of the data storage system satisfies the following characteristics:

any two physical blocks in a stripe are distributed on different disks;

numbers of data blocks distributed on each disk are the same, and numbers of parity blocks distributed on each disk are the same; and blocks sharing stripes with blocks on any given disk are distributed evenly among all other disks;

wherein the first number is a power of a prime number, and the first number is represented by a number n, which is greater than or equal to 4, stripe width is indicated by a number k, and for the number n, (n−1) orthogonal Latin squares being capable of being obtained, and the data layout of the data storage system is generated as follows:

k mutual orthogonal Latin squares in (n−1) mutual orthogonal Latin squares are obtained with rows having same element values in the k mutual orthogonal Latin squares ignored, and then all remaining positions in the k mutual orthogonal Latin squares are traversed in a row-first order, combining element values in same row and column into a mapping group, and each mapping group corresponds to one stripe, and a value of each element in each mapping group indicates an ordinal number of a disk on which each block in a corresponding stripe is placed.

2. The data storage system of claim 1, wherein the k mutual orthogonal Latin squares are generated according to the following theorem: a first row among all the rows of each generated Latin square is ignored and a first mutual orthogonal Latin square in k generated squares is represented by $L_0$; assuming the element on the $i^{th}$ row and $j^{th}$ column of the $m^{th}$ orthogonal Latin square to be $L_{m-1}[ij]$, the mapping group $(L_0[ij], \ldots, L_{m-1}[ij], \ldots, L_{k-1}[ij])$ indicates ordinal numbers of disks on which respective blocks on the $((i-1)*n+j)^{th}$ stripe are placed, wherein a first block is placed on the $L_0[ij]^{th}$ disk, an $m^{th}$ block is placed on the $L_{m-1}[ij]^{th}$ disk, and a $k^{th}$ block is placed on the $L_{k-1}[ij]^{th}$ disk, wherein data for each disk are placed in blocks, theorem: for a complete set of mutually orthogonal Latin squares with its order being a power of a prime number, the $i^{th}$ Latin square $f_i$ ($i \in [1, n-1]$) has an element value $fi[x, y]=i \cdot x+y$ in the $x^{th}$ row and $y^{th}$ column, where the operator '·' and '+' are the multiplication and addition in a finite field.

3. The data storage system of claim 1, wherein when one disk fails, for each failed stripe associated with the failed disk, data from other disks associated with the failed stripe for calculating reconstructed data are concurrently read, and the reconstructed data are stored in free space reserved on all other disks, and an ordinal number of the disk on which the reconstructed data is written is determined as follows:

selecting a Latin square from (n−1) mutual orthogonal Latin squares other than the k mutual orthogonal Latin squares, and referring the selected Latin square as the $(k+1)^{th}$ Latin square, for each failed stripe associated with the failed disk, identifying a position on the Latin squares corresponding to the failed stripe, and obtaining a first element value at the position on the $(k+1)^{th}$ Latin square, the first element value indicating an ordinal number of the disk on which the reconstructed data is placed, and storing the reconstructed data in free space of the disk indicated by the ordinal number.

4. The data storage system of claim 3, wherein when another disk fails, a Latin square of (n−1) mutual orthogonal Latin squares other than the k mutual orthogonal Latin squares and the $(k+1)^{th}$ Latin square is selected and referred to as the $(k+2)^{th}$ Latin square, for each failed stripe associated with the failed disk, a position on the Latin squares corresponding to the each failed stripe is identified, and a second element value at the position on the $(k+2)^{th}$ Latin square is obtained, the second element value indicating the ordinal number of the disk on which the reconstructed data block is placed, and the reconstructed data block is stored in free space of the disk indicated by the number.

5. The data storage system of claim 1, wherein when p disks fail simultaneously, a stripe associated with any one of the p disks is determined;

for any stripes associated with any of the p failed disks, a number of data blocks in stripes that locate on the p failed disks is determined;

a higher recovery priority for a stripe having a larger number of data blocks located in the p failed disks is assigned; and the stripe with higher priority is recovered with priority.

6. The data storage system of claim 1, wherein the data storage system stores data with different storage templates;

for first data to be stored according to a first template;

a first corresponding space in the first number of disks is allocated to the first data; and for the first corresponding space in the first number of disks, mapping a relationship between data stripes in the first template;

for second data to be stored according to a second template;

a second corresponding space in the first number of disks is allocated to the second data; and for the second corresponding space in the first number of disks, mapping a relationship between the data stripes in the second template.

7. The data storage system of claim 6, wherein the first template and the second template at least differ in one aspect of RAID levels, stripe width, physical block size, and inter-stripe addressing policy.

8. The data storage system of claim 6, wherein the first corresponding space is denoted as a logical volume, and each logical volume uses a same type of data template as granularity of storage space allocation, wherein an indexing technique is used to track a physical location of each data template in a logical volume, metadata is maintained to realize a map between user volumes and physical space, and the metadata is cached in memory.

9. The data storage system of claim 8, wherein when a user request arrives, a specific physical access location is located by querying index tables, locating data templates, locating stripes, locating internal block locations of stripes, and calculating global locations.

10. The data storage system of claim 1, wherein when data to store is desired to be stored in a read-friendly ordering;

determining a mapping relationship between stripes and disks wherein a parity block in one stripe is a last data block of the one stripe; and individual stripes are sorted so that an ordinal number of a disk on which the last block in a stripe is located is an ordinal number of a disk on which the first data block in the next stripe is located.

11. The data storage system of claim 1, wherein when data to store is desired to be stored in a write-friendly ordering;

a parity block in one stripe is a last block of the one stripe;

individual stripes are sorted so that an ordinal number of a disk on which the last block in a stripe is located is an amount less than an ordinal number of a disk on which the first block in the next stripe is located; and the amount is a row number of a position of a mapping group corresponding to the stripe in the k mutual orthogonal Latin squares.

* * * * *